(12) United States Patent
Fairman et al.

(10) Patent No.: US 7,225,285 B1
(45) Date of Patent: May 29, 2007

(54) ASSIGNING INTERRUPTS IN MULTI-MASTER SYSTEMS

(75) Inventors: Michael Fairman, Santa Cruz, CA (US); Timothy Allen, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 261 days.

(21) Appl. No.: 10/935,771

(22) Filed: Sep. 7, 2004

(51) Int. Cl.
*G06F 13/24* (2006.01)
(52) U.S. Cl. ..................... 710/266; 710/268
(58) Field of Classification Search .......... 710/260, 710/261, 263, 264, 266, 268, 269, 316, 317; 326/38, 39; 716/16, 17
See application file for complete search history.

(56) References Cited

U.S. PATENT DOCUMENTS

| | | | | |
|---|---|---|---|---|
| 4,495,569 A | * | 1/1985 | Kagawa | 710/268 |
| 4,930,070 A | * | 5/1990 | Yonekura et al. | 710/262 |
| 5,125,093 A | * | 6/1992 | McFarland | 710/266 |
| 6,483,342 B2 | * | 11/2002 | Britton et al. | 326/39 |
| 6,738,847 B1 | * | 5/2004 | Beale et al. | 710/260 |
| 6,952,749 B2 | * | 10/2005 | Kim | 710/260 |
| 6,996,796 B2 | * | 2/2006 | Sanchez et al. | 716/16 |
| 7,076,595 B1 | * | 7/2006 | Dao et al. | 710/317 |

OTHER PUBLICATIONS

A Comparison of Five Different Multiprocessor Soc Bus Architectures, Ryu et al., IEEE, 2001.*
A Field Programmable System Chip with Combines FPGA and ASIC Circuitry, Andrew et al., IEEE, 1999.*
Bus Architecture of a System on a Chip with User-Configurable System Logic, Winegarden, IEEE, 2000.*
AMBA Embedded Controller Platform with Multimaster AMBA, Alliance Core, Oct. 18, 2002.*
Overview of Exacalibur, Leon, Microblaze, Nios OpenRisc, and Virtex II Pro, Driessens et al., 2003.*
Altera Corporation, 70 page document entitled, "Excalibur, Nios Tutorial", Document Version 1.1, Document date Apr. 2002, Copyright 2002, http://www.altera.com/literature/tt/tt_nios_hw_apex_20k200e.pdf.
Altera Corporation, 14 page document entitled, "Quartus II Handbook, vol. 1, 2. System Design Using SOPC Builder", Dec. 2004, qii51003-2.1, http://www.altera.com/literature/hb/qts/qts_qii51003.pdf.
Altera Corporation, 14 page document entitled, "Quartus II Handbook, vol. 4, 2. Tour of the SOPC Builder User Interface", Feb. 2005 QII54002-1.0, http://www.altera.com/literature/hb/qts/qts_qii54002.pdf.
Xilinix Development System, 32 page document entitled, "MicroBlaze Development Kit Tutorial", Copyright 1994-2002, http://www.ee.calpoly.edu/cpe-329/EDK_Resources/mb_tutorial_c2bits.pdf.

* cited by examiner

*Primary Examiner*—Khanh Dang
(74) *Attorney, Agent, or Firm*—Beyer Weaver LLP (57) ABSTRACT

Techniques and mechanisms provide management of interrupt requests in a system, such as a programmable chip system. The system may include multiple master components and slave components. Techniques and mechanisms are described for assigning interrupts to slave components on a per master component basis. When a slave component initiates an interrupt request, a master component associated with the request will handle the interrupt without disrupting operation of other master components in the system.

14 Claims, 9 Drawing Sheets

ASSIGNING INTERRUPTS IN MULTI-MASTER SYSTEMS

BACKGROUND OF THE INVENTION

1. Field of the Invention

The present invention generally relates to managing interrupt requests in programmable chip systems. More specifically, the invention relates to apparatus and methods for assigning interrupts in multi-master programmable chip systems.

2. Description of the Prior Art

A programmable chip system often includes master and slave components. A master component such as a processor typically initiates requests to slave components such as timers and parallel input/output (PIO) interfaces for data. In some cases, slave components may also initiate requests to master components. For instance, a slave component may generate and send an interrupt request to the master component.

Conventional programmable chip systems incorporate buses that often limit the number of master components that coexists in the system. However, some programmable chip systems offer mechanisms that allow multiple master components to operate efficiently. Systems that include multiple master components are referred to herein as multi-master systems. As the number of master components increases in multi-master systems, the task of assigning interrupt request numbers to particular slave and master component combinations becomes more challenging. Although there have been several approaches used to address this issue, more improvements to the assignment of interrupt requests in multi-master systems are needed.

In view of the foregoing, a system specifically designed to provide effective management of interrupt requests in multi-master systems would be highly beneficial.

SUMMARY OF THE INVENTION

The techniques and mechanisms of the present invention relate to interrupt handling in a system, such as a programmable chip system. A programmable chip system includes multiple interconnected master components and slave components. When a slave component initiates an interrupt request, a master component associated with the request will handle the interrupt without necessarily disrupting operation of other master components in the system.

In one example, multiple master components and multiple slave components are interconnected in a simultaneous multiple master component fabric. Master components are assigned ranges of interrupt request numbers and slave components use numbers within these ranges. Interrupts within these ranges are handled by particular master components while remaining transparent to other master components.

Mechanisms for efficiently assigning, identifying, and verifying interrupt request numbers are also provided. The techniques of the present invention allow efficient interrupt handling in multiple master components systems with fewer negative effects on system performance.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For instance, the techniques of the present invention will be described in the context of particular design automation tools. However, it should be noted that the techniques of the present invention can be applied to a variety of tools and associated code provided with the tools. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides techniques and mechanisms for managing interrupt requests in a programmable chip system. The system may include multiple master components and slave components. In general, assignment of interrupts to systems having various arrangements of multiple master and slave component combinations is provided. For instance, techniques and mechanisms are provided for assigning interrupts to slave components on per master component basis.

Any component or device that is operable to initiate read and/or write operations by providing control information is referred to herein as a primary component. Primary components are sometimes referred to herein as master components. Control information can include a particular address associated with a secondary component. Any component or device that responds to read or write operations with information sent back to the primary component regarding the read or write operation is referred to herein as a secondary component. Secondary components are sometimes referred to herein as slave components. Some examples of primary components include processors, microcontrollers, and Ethernet devices. Some examples of secondary components include Universal Asynchronous Receiver Transmitters (UARTs), Parallel Input Output (PIO), program memory, and data memory. It should be noted that some components such as an Ethernet component can be both a primary component and a secondary component, because an Ethernet component has the capability of reading and writing to the secondary program memory while also responding to instructions from a primary system CPU.

As mentioned earlier, programmable chip systems can include multiple master and slave components. Conventional programmable chip systems include components interconnected with a bus architecture. Using a bus architecture tends to decrease the likelihood that a design includes a large number of master components. A large number of master components used in a bus architecture can render a bus architecture highly inefficient. However, a simultaneous multiple primary component interconnection fabric, available from Altera Corporation of San Jose, Calif., enables the efficient use of a larger number of master components. A simultaneous multiple primary component fabric integrated system is described in U.S. patent application Ser. No. 10/227,504, filed Aug. 23, 2002, entitled "Methods and Apparatus for Bus Mastering and Arbitration", the contents of which is hereby incorporated by reference.

In general, some slave components can generate an interrupt request to send to a master component. The interrupt request may be used to seek a response from the master component. Interrupts are commonly used within systems having master and slave components. Before an interrupt request can be generated by the slave component, an interrupt request number is generally assigned to the interrupt-generating slave. Conventionally, an interrupt-generating slave is assigned a single interrupt request number. The single interrupt request number is used to interrupt all masters connected to that slave. In cases where a system has multiple interrupt-generating slaves, each slave would be individually assigned an interrupt request number. Typically the interrupt request number is different for all the slave components. However, certain masters are configured to handle requests from only certain slaves while other masters are not. As such, some of the connected masters would be interrupted even if no response from those master is warranted. In other words, the assignments are generally done indiscriminately and globally without consideration to which masters are configured to handle the interrupts from that slave. Furthermore, the assignments are assigned solely on a peripheral (e.g., slave component) basis. As such, inefficiencies in the system would usually result.

In addition, some master components are configured to accept only interrupt request numbers within predefined ranges. That is, interrupt-generating slaves must be assigned interrupt request numbers that fall within these predefined ranges. Since a slave component is generally assigned an interrupt request number that is the same for all of its connected masters, the possibility of having slave components assigned interrupt request numbers that do not meet the different predefined ranges of connected master components increases. For example, suppose a slave A is connected to master B and master C. Suppose again that master B expects its interrupts to be assigned a number between 1 and 10, and master C expects its interrupts to be assigned a number between 20 and 30. In this case, no valid number can be assigned that works for both masters.

Consequently, assigning interrupts becomes more complex in systems that include many master components coupled to many slave components. Therefore, the techniques of the present invention provide the assignment of interrupts on a master-by-master basis. Furthermore, each master and slave combination/connection can have its own distinct interrupt request number assigned. As such, interrupt request signals can be connected and assigned numbers on a master-by-master basis. Although the default connection behavior is the typical desired solution for embedded systems (where interrupt requests are sent to only one master), users have complete freedom to connect and assign interrupt requests however they see fit.

Figure 1:
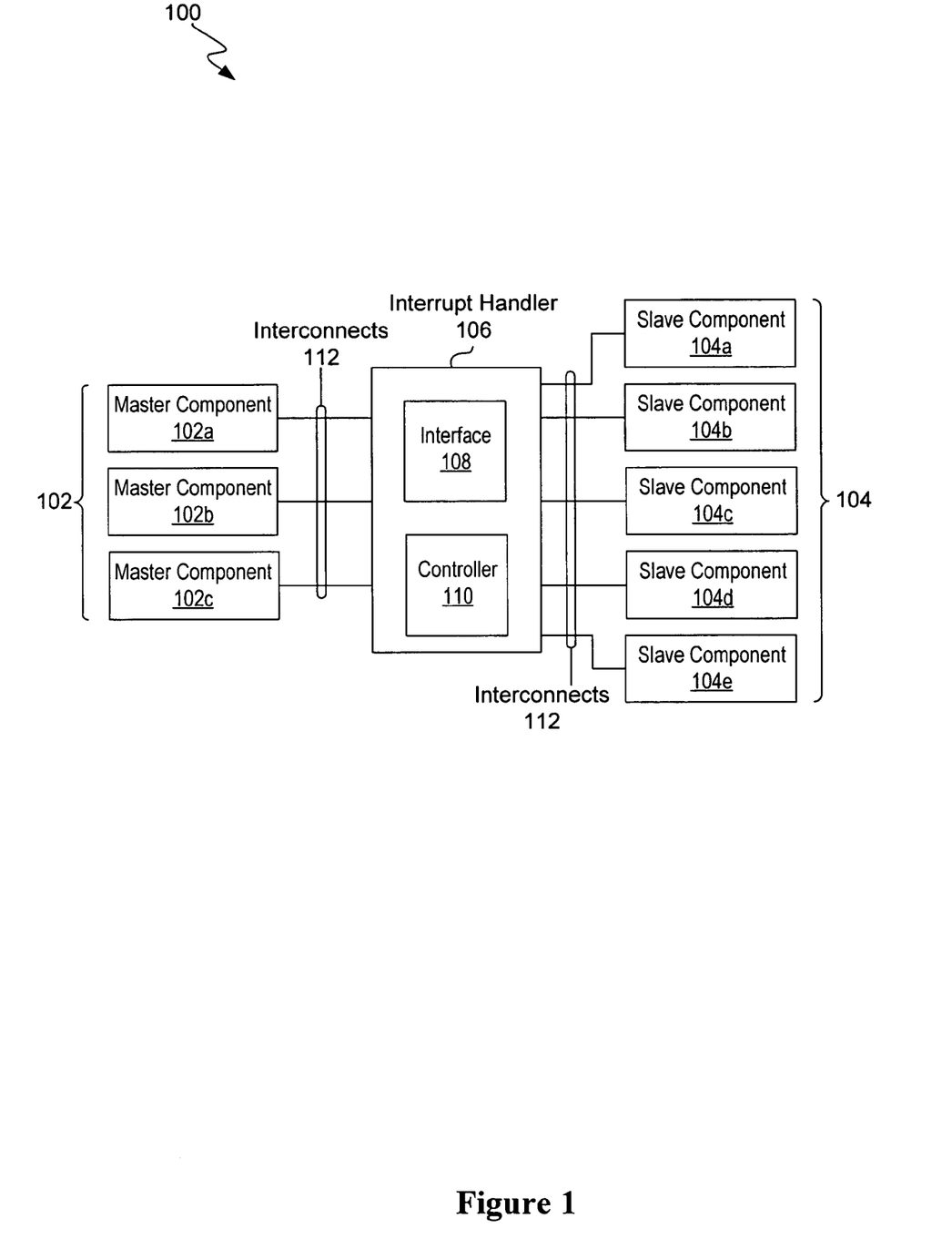
FIG. 1 illustrates a system having an interrupt handler for use with multiple master and slave components.

FIG. 1 illustrates a system 100 having an interrupt handler 106 for use with multiple master components 102 (e.g., 102*a–c*) and slave components 104 (e.g., 104*a–e*). Interrupt handler 106 is generally used for handling interrupt requests between master and slave component combinations. The master and slave component combinations are linked to interrupt handler 106 with interconnects 112. Interrupt handler 106 may be integrated within a conventional bus or an interconnection fabric, such as a simultaneous multiple master interconnection fabric. Typically, interrupt handler 106 includes an interface 108 and a controller 110. Interface 108 provides input and output resources for interrupt handler 106. Interface 108 can include separate input and output interfaces. Controller 110 provides management resources such as algorithms for handling the interrupts in accordance to the present invention. According to various embodiments, the input interface is configured to receive an interrupt request from a slave component whereas controller 110 is configured to identify which one of the master components 102 is associated with the interrupt request. Furthermore, the output interface is configured to route the interrupt request to the identified master component.

Figure 2:
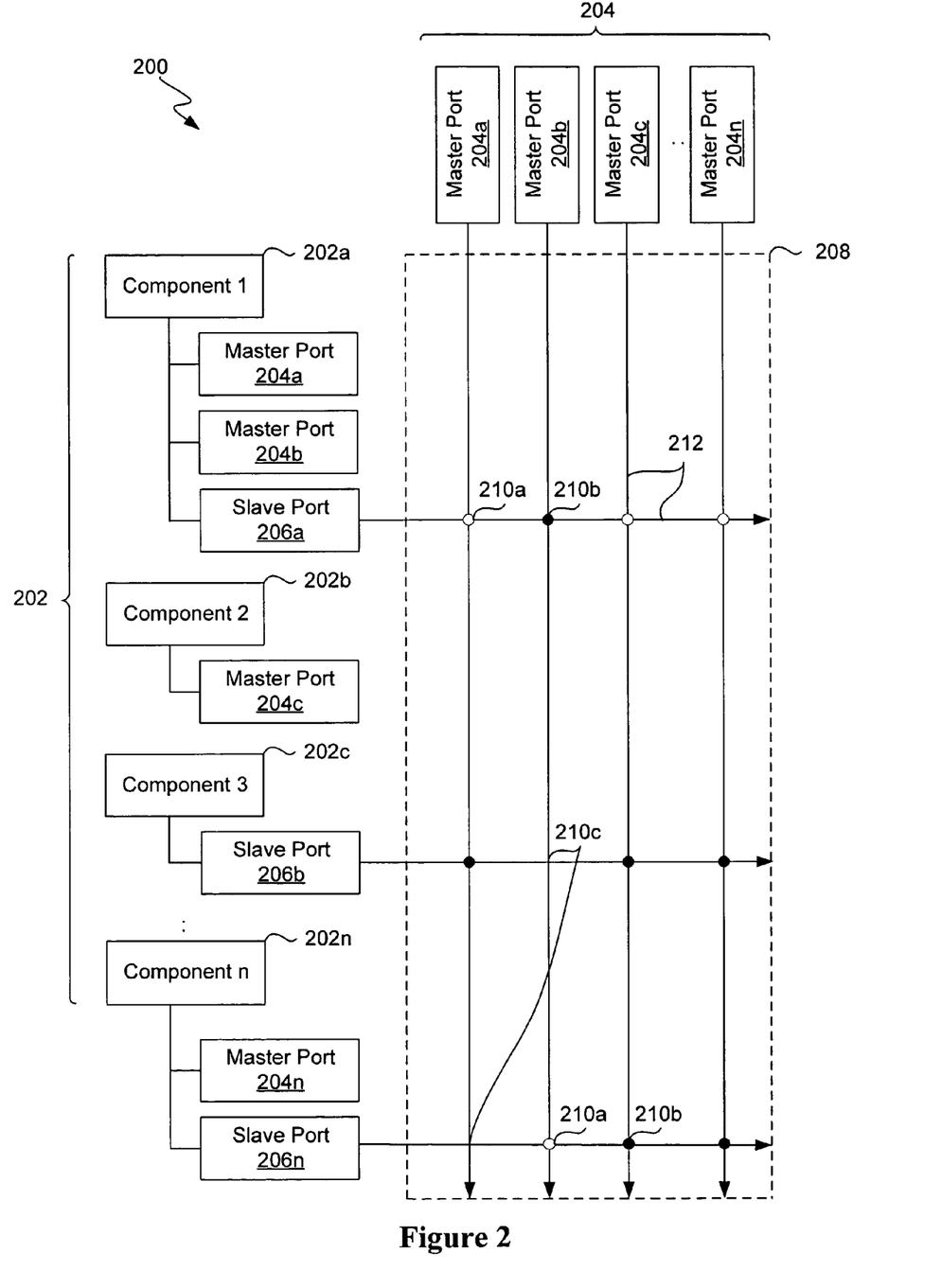
FIG. 2 is a table representation showing various interconnected master and slave components.

FIG. 2 is a table representation 200 showing various interconnected master and slave components in a system. The table representation is further described in U.S. patent application No. 60/606,966, filed Sep. 3, 2004, entitled "Providing Component Connection Information", the contents of which is hereby incorporated by reference. As shown, table representation 200 includes multiple components 202, such as components 1 (i.e., 202*a*), 2 (i.e., 202*b*), 3 (i.e., 202*c*), through component n (i.e., 202*n*). Also shown are multiple ports 204 and 206, which may be used to interconnect the multiple components. For instance, component 1 has two master ports 204*a* and 204*b* along with one slave port 206*a*. Similarly, component 2 has only a master port 204*c* while component 3 has only a slave port 206*b*. Each component may have any number of corresponding ports that can be used to provide interconnections typically with other components. In general, the ports are configured for interconnecting interrelated components, such as primary and secondary components. Arbitrary connection between master and slave ports in a system composed of intellectual property (IP) blocks is possible. Further as shown, a patch panel 208 specifies the connections.

In this specific embodiment, multiple components 202, such as components 1 through n, are provided with relationship information (e.g., possible connection, actual connection, no connection) that corresponds to multiple ports 204/206. As such, patch panel 208 provides information about the relationships between the multiple components 202 via respective master ports 204 (e.g., 204a, 204b, 204c, 204n) and/or slave ports 206 (e.g., 206a, 206b, 206n). Connectable nodes 210a/210b and non-connectable nodes 210c are used to identify/represent relationship information (e.g., whether a master-slave connection is available; how many connections correspond to a particular component; the complexity of the digital design; etc.). An open connectable node 210a denotes a possible connection (e.g., electrical connection) between a pair of components/ports, whereas a closed connectable node 210b denotes a closed connection (e.g. electrical connection) between a pair of components/ports. Open connectable node 210a may be toggled to closed connectable node 210b and vice versa through a toggling feature. The toggling feature typically allows a user to change the status of a node with an input device such as a mouse, keyboard, or the like. Non-connectable nodes 210c denote that no connections are available between the pair of components/ports indicated by the matrix of interconnection lines 212. In one embodiment, the patch panel shows connectable nodes and connected nodes associated with a simultaneous multiple primary component fabric.

Figure 3:
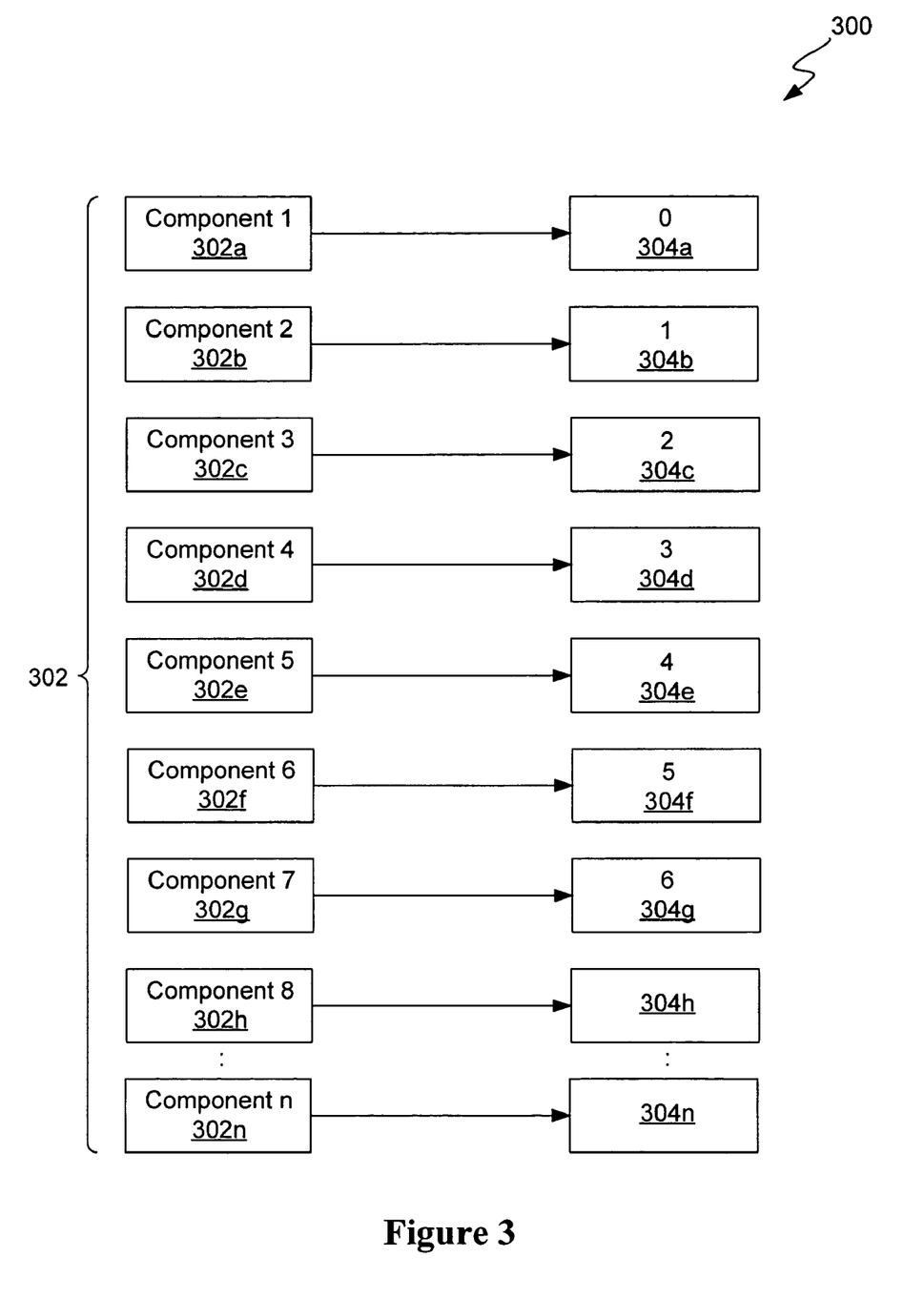
FIG. 3 is a table representation showing interrupts assigned to particular slave components.

FIG. 3 is a table representation 300 showing interrupts assigned to particular slave components 302 in a system. As shown, slave components 1 through 7 (i.e., 302a–g) are assigned interrupts request numbers 304a–g with values 0, 1, 2, 3, 4, 5, and 6 respectively. Each assigned interrupt request number corresponds to associated master components connected to that particular slave component. It should be noted that not every slave component is configured to generate an interrupt request. Therefore, an interrupt request number is not assigned to them. For example, component 8 (i.e., 302h) is shown without any assigned interrupt request number 304h. It should be noted that the interrupt request numbers are not necessarily uniquely assigned, although they frequently are.

Conventionally, interrupt requests for the interrupt-generating slaves are sent to all connected masters, and the interrupt request for each slave is assigned the same number for all these masters. For example, suppose a slave component 1 (i.e., 302a) is connected to two masters A and B. Then slave component 1's interrupt request signal would always be sent to both connected masters A and B. Furthermore, both A and B would "see" the interrupt request from slave component 1 as interrupt request number 0 (i.e., 304a). Masters A and B would momentarily stop processing to handle the interrupt request. However, in a typical embedded system, an interrupt needs to be handled by only a single master component. Other master components are needlessly interrupted.

According to various embodiments, techniques and mechanisms are provided to assign interrupts on a per master basis. Other master components are not interrupted with extraneous interrupt requests. Having interrupt requests interrupt only a designated master component is also referred to herein as making interrupts or interrupt requests transparent to one or more other master components. In some examples, interrupts are sent only to a particular designated master and remain transparent to other master components. In other examples, an interrupt is assigned in a range where only a single master can detect it.

Figure 4:
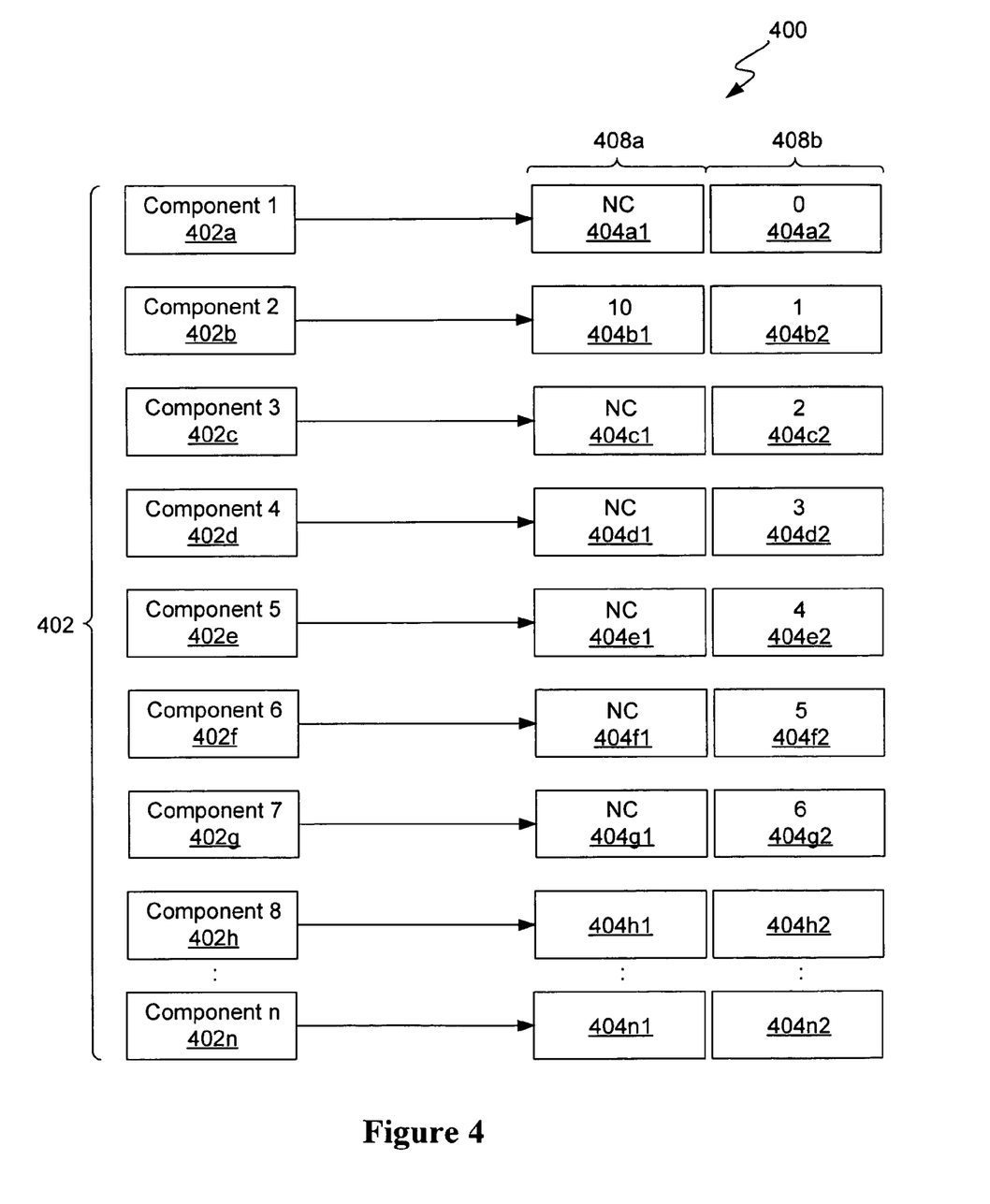
FIG. 4 is a table representation showing interrupts assigned on a per master basis.

In order to better facilitate the assignment of interrupts in multi-master systems, a master-by-master assignment technique is provided. FIG. 4 is a table representation 400 showing interrupts and interrupt numbers 404 assigned on a per master basis in a system. The exemplary system has two masters A and B. Similar to FIG. 3, components 1–7 (i.e., 402a–g) can generate interrupts, but now the interrupt connections for masters A and B are represented independently by distinct columns 408a and 408b respectively. A value of "NC" denotes that the slave component is "not connected" to the particular master component (e.g., 408a, 408b). Thus, in the current system, most of the interrupt-generating slaves are connected to only one master (denoted N/C on other masters). One of the slave components (i.e., 402b) can interrupt either master A or B. Master A "sees" this slave on interrupt request number 10 (i.e., 404b1) whereas master B "sees" this slave on interrupt request number 1 (i.e., 404b2). It should be noted that not every master component accepts interrupts. Typically, a master component that accepts interrupts is configured with an interrupt interface, such as an interrupt input pin. Such master components can be quickly identified for inclusion into table representation 400.

The assignment of interrupts on a master-by-master basis includes mechanisms and techniques that allow proper assignment of interrupts. In one embodiment, computer code is used to validate the interrupt request number entries on a master-by-master basis. That is, the code will determine whether the entered interrupt request number for a slave component is valid based on the interrupt request number ranges for a particular master component.

In one example, a master component CPU1 has an interrupt request number range of 0–8 and another master component CPU2 has an interrupt request number range of 16–24. If an interrupt entry for a slave component connected to CPU 1 is value 3 and an interrupt entry for a slave component connected to CPU2 is value 17, then the interrupt entries would be accepted and assigned to those slave components accordingly. Code can be used to validate the interrupt entries based on each connected master component independently from other connected master components. Any validation technique may be used. For example, the validation may be based on whether the interrupt entry has already been assigned to another slave connected to the same master component. If the interrupt entry is invalid, a message to the user can be generated. It should be noted that according to one embodiment of the present invention, the assignment of interrupts request numbers to individual slaves is based on the connected master component (e.g., the associated interrupt request number range) and not solely on the slaves.

The interrupt request number ranges can be separated into available and non-available assignable interrupt request numbers. The available assignable request numbers are those not yet assigned to other slave components for the particular master component. The non-available assignable interrupt request numbers are those already assigned to other slave components for the particular master component. As such, the validation by the code may be based on whether the interrupt request number entry matches either the available or non-available assignable interrupt request numbers. If the entry matches an available assignable interrupt request number, the validation may proceed to assign the interrupt by accepting the interrupt entry for the particular master component. On the other hand, if the entry matches a non-available assignable interrupt request number, the validation may proceed to assign the interrupt by rejecting the interrupt entry for the particular master component. In this case, the user may enter another entry for validation by the code.

Figure 5:
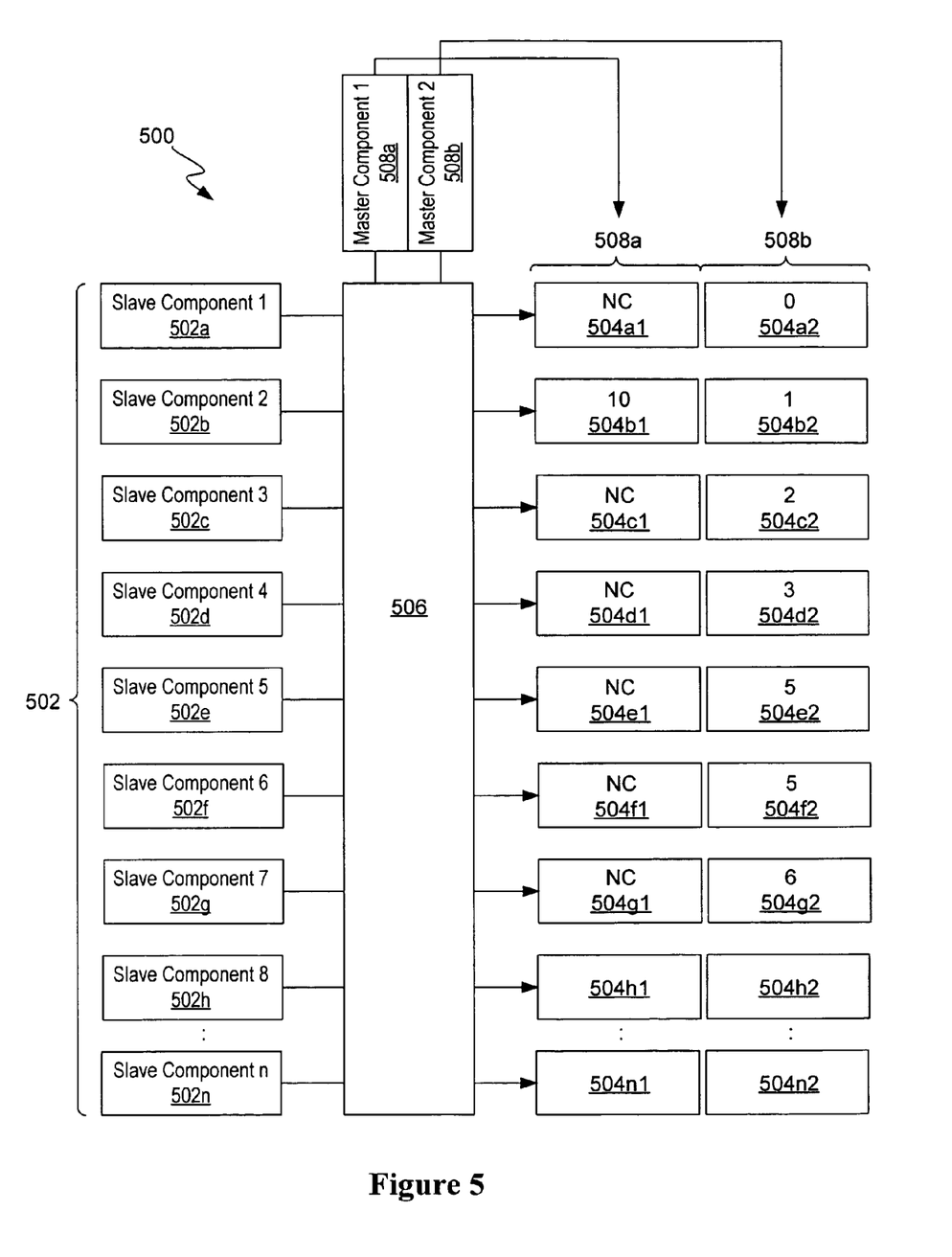
FIG. 5 is a table representation showing interrupts assigned on a per master basis using an interconnection matrix/patch panel.

As a further enhancement to table representation 400, FIG. 5 is a table representation 500 showing interrupts assigned on a per master basis using an interconnection matrix/patch panel. As shown, multiple slave components 502 (e.g., 502a–n) are provided with relationship information that corresponds to master component 1 (i.e., 508a) and master component 2 (i.e., 508b). A patch panel 506 provides the relationship information, as discussed earlier in reference to FIG. 2. The multiple slave components 502, patch panel 506, and master components 1 (i.e., 508a) and 2 (i.e., 508b), are further linked to corresponding interrupt request numbers 504. Interrupt request numbers 504 are provided such that their associations (e.g., with leader lines) with particular master and slave component combinations are clearly identifiable. For example, slave component 1 (i.e., 502a) is shown to be an interrupt-generating slave with an assigned interrupt request number 0 for master component 2 (i.e., 508b). Yet, slave component 1 (i.e., 502a) is shown not connected "NC" (i.e., 504a1) to master component 1 (i.e., 508a). Therefore, no interrupt request number value is assigned to slave component 1 (i.e., 502a) for master component 1 (i.e., 508a).

FIG. 5 is similar to FIG. 4 except for the inclusion of portions of FIG. 2. Specifically, patch panel 506 is included to aid in quickly identifying interconnections between master and slave components. As such, patch panel 506 also aids in quickly assigning interrupts on a per master basis. For instance, interconnectivity between slave component 1 (i.e., 502a) and master component 508b as provided in patch panel 506 allows the easy assignment of an interrupt request number 504. In this case, the assignment of an interrupt request number for slave component 1 (i.e., 502a) has already been entered and accepted with a value of 0 (i.e., 504a2). Other slave components 502 can be similarly assigned with interrupt request numbers 504 (e.g., 504a1–n1) for master component 508a and with interrupt request numbers 504 (e.g., 504a2–n2) for master component 508b.

Figure 6:
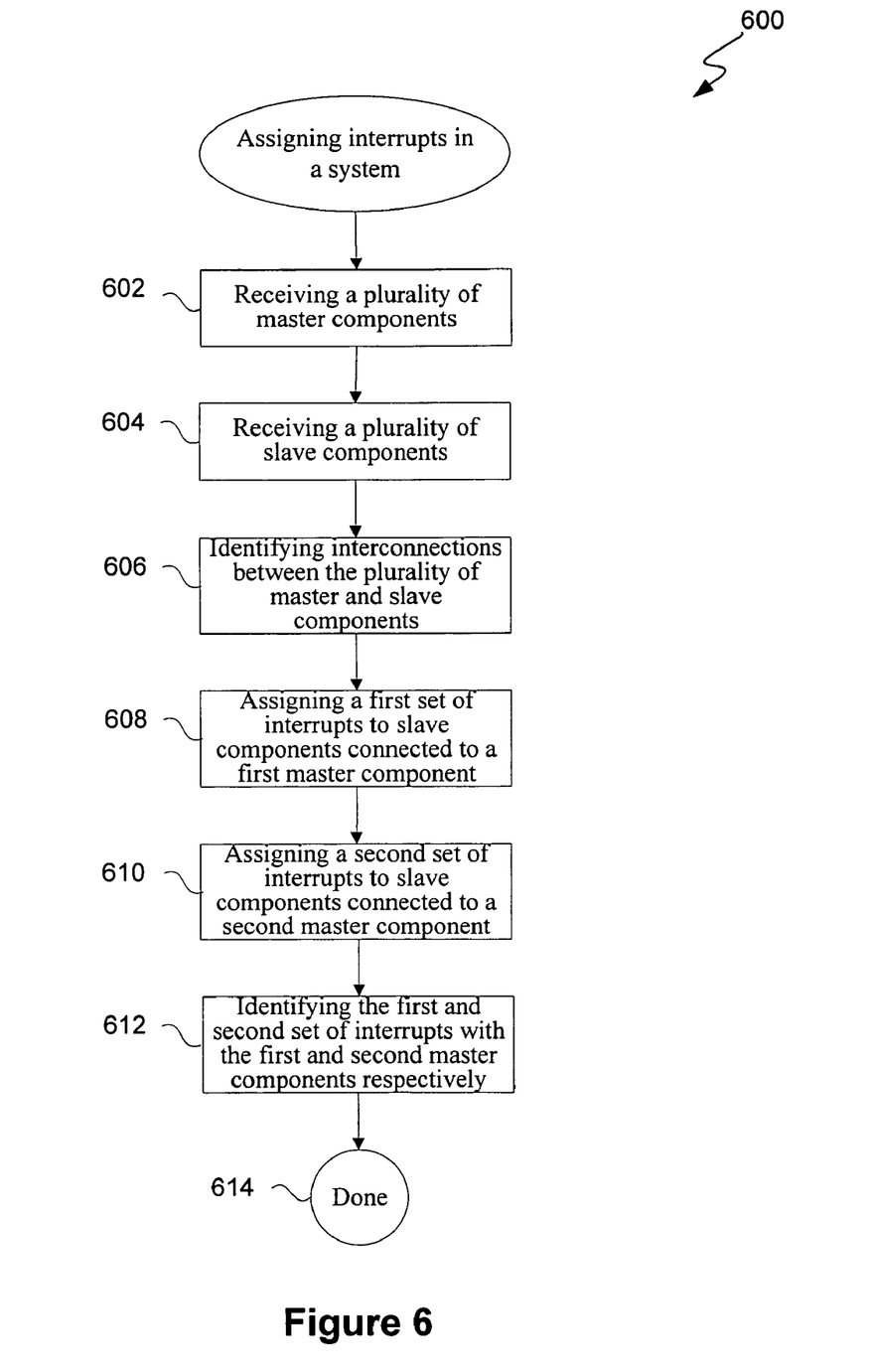
FIG. 6 illustrates a process flow for assigning interrupts in a system according to various embodiments of the present invention.

FIG. 6 illustrates a process flow for assigning interrupts in a system according to various embodiments of the present invention. Process flow 600 typically starts with receiving multiple master components in operation 602 and receiving a plurality of slave components in operation 604. The multiple master and slave components may represent a portion of a multi-master system. Afterwards, identifying interconnections between the multiple master and slave components is performed in operation 606. The identifying operation may include connecting multiple slave components with multiple master components. For example, the patch panel in FIG. 2 may be used for such identification purposes.

At 608, a first set of interrupts for slave components connected to a first master component are assigned. Assigning the first set of interrupts operation may include receiving a plurality of interrupt entries for slave components connected to the first master component and then comparing each interrupt entry to a range of assignable interrupts for the first master component. The interrupt entries that are within the range of assignable interrupts can then be accepted for the first master component. The accepted interrupt entries can be the first set of interrupts assigned. Assigning the first set of interrupts operation may further include rejecting the interrupt entries that are outside the range of assignable interrupts for the first master component.

In general, the range of assignable interrupts includes available and non-available assignable interrupts such that any comparison may include comparing each interrupt entry to the available assignable interrupts for the first master component and accepting the interrupt entries that also match the available assignable interrupts for the first master component. The comparing operation may further include rejecting the interrupts that match the non-available assignable interrupts for the first master component.

Next, assigning a second set of interrupts to slave components connected to a second master component is performed in operation 610. Assigning the second set of interrupts operation may include receiving a plurality of interrupt entries for slave components connected to the second master component and then comparing each interrupt entry to a range of assignable interrupts for the second master component. The interrupt entries that are within the range of assignable interrupts for the second master component can then be accepted. The accepted interrupt entries can be the second set of interrupts assigned. Assigning the second set of interrupts operation may further include rejecting the interrupt entries that are outside the range of assignable interrupts for the second master component.

In general, the range of assignable interrupts includes available and non-available assignable interrupts such that the comparing operation may include comparing each interrupt entry to the available assignable interrupts for the second master component; and accepting the interrupt entries that also match the available assignable interrupts for the second master component. The comparing operation may further include rejecting the interrupts that match the non-available assignable interrupts for the second master component.

Assignment of the first set of interrupts is typically independent from the second set of interrupts. However, the assignment may also be dependent. Optionally, identifying the first and second set of interrupts with the first and second master components respectively is performed in operation 612. This may include linking (e.g., with leader lines) the set of interrupts with their corresponding master component. Process flow 600 ends at operation 614. It will be obvious to those skilled in the art that any portion of process flow 600 may be omitted, modified, or repeated to provide assignment of interrupts in accordance to the present invention. For example, assigning the first and second set of interrupts operations may be performed automatically using default interrupts. That is, assigning automatically interrupt request numbers using predefined default values.

Interrupts can be assigned on a per master basis for components associated with a variety of systems. However, the per master interrupt assignment mechanisms of the present invention are particularly applicable to programmable chip systems having multiple master components.

Figure 7:
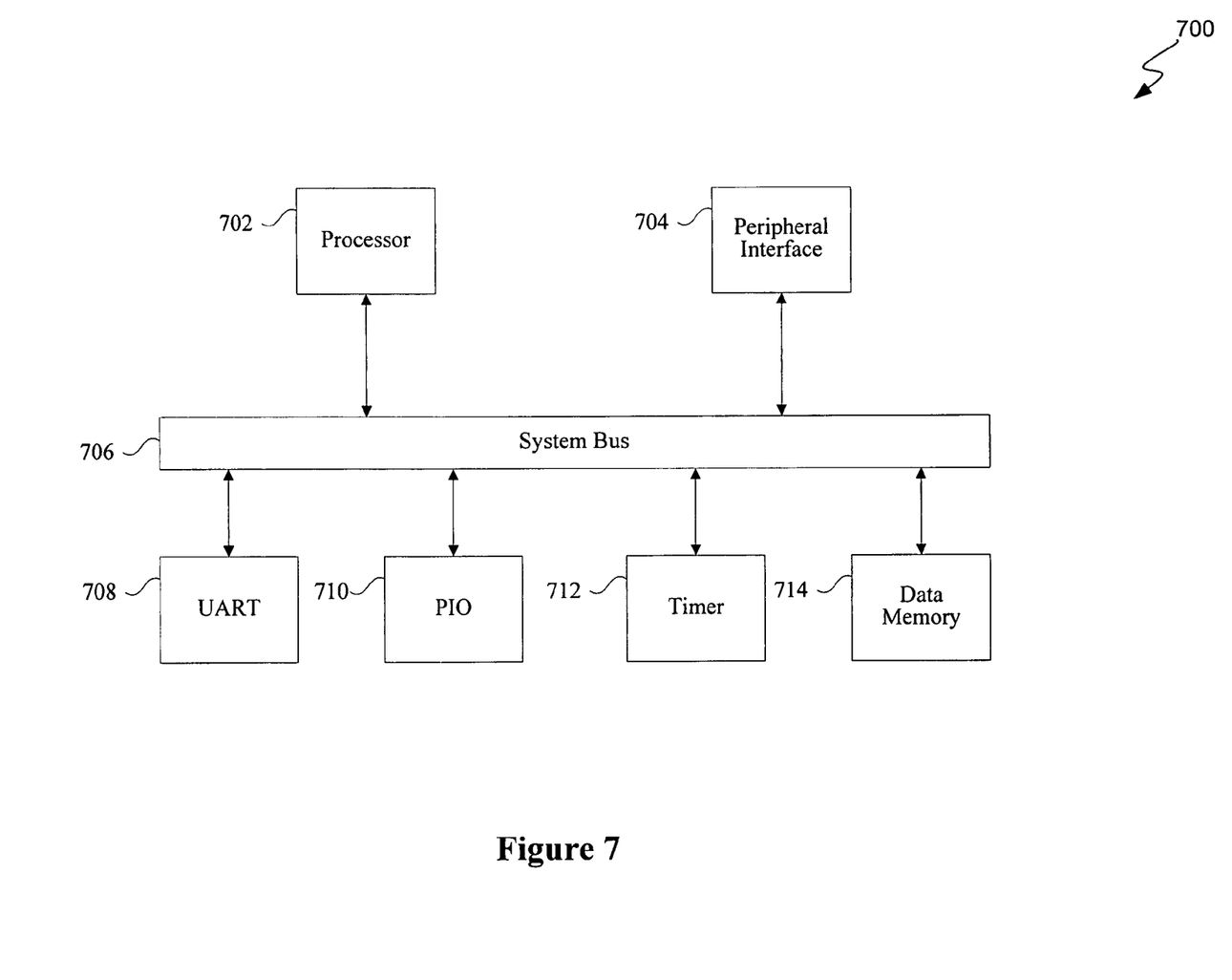
FIG. 7 is a diagrammatic representation showing one example of a programmable chip system.

FIG. 7 is a diagrammatic representation showing one example of a programmable chip system 700. Peripheral devices and peripheral interfaces are herein referred to as components. The system on a programmable chip includes processor core 702 and a peripheral interface 704 as well as peripheral components UART 708, PIO 710, timer 712, and data memory 714. In some examples, the peripheral interface 704 is a memory controller with an associated bus bridge. It should be noted that the system can include both on-chip and off-chip memory.

System bus 706 provides interconnectivity amongst the components in system 700. In one embodiment, system bus 706 includes a conventional bus architecture. In another embodiment, system bus 706 includes a simultaneous multiple primary component fabric, such as the Avalon™ Switch Fabric available from Altera Corporation, San Jose, Calif.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and fast cascade chain, register and preset/reset logic for the register.

Figure 8:
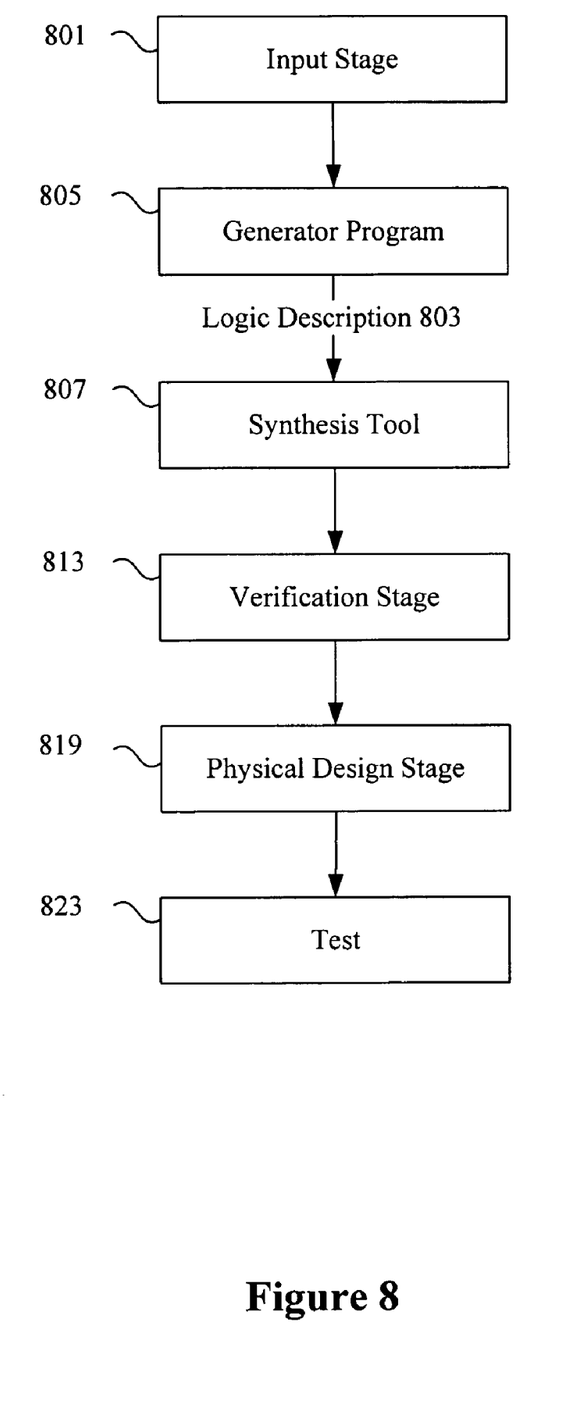
FIG. 8 is a diagrammatic representation showing implementation of a programmable chip.

FIG. 8 is a diagrammatic representation showing implementation of an electronic device (e.g., programmable chip) using a programmable chip tool. An input stage 801 receives selection information typically from a user for logic such as a processor core as well as other components such as a streaming output device to be implemented on an electronic device. A generator program 805 creates a logic description and provides the logic description along with other customized logic to any of a variety of synthesis tools, place and route programs, and logic configuration tools to allow a logic description to be implemented on an electronic device.

In one example, an input stage 801 often allows selection and parameterization of components to be used on an electronic device. In some examples, components provided to an input stage include intellectual property functions, megafunctions, and intellectual property cores. The components may be stored and retrieved from a library or database. The input stage 801 may be a graphical user interface using wizards for allowing efficient or convenient entry of information. The input stage may also be a text interface or a program reading a data file such as a spreadsheet, database table, or schematic to acquire selection information. The input stage 801 produces an output containing information about the various components selected. In some examples, the input stage 801 allows assignment of interrupts.

In typical implementations, the generator program 805 can identify the selections and generate a logic description with information for implementing the various components. The generator program 805 can be a Perl script creating HDL files such as Verilog, Abel, VHDL, and AHDL files from the module information entered by a user. According to various embodiments, the generator program 805 also provides information to a synthesis tool 807 to allow HDL files to be automatically synthesized. In some examples, a logic description is provided directly by a designer. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 801, generator program 805, and synthesis tool 807 can be separate programs. The interface between the separate programs can be a database file, a log, or simply messages transmitted between the programs. For example, instead of writing a file to storage, the input stage 801 can send messages directly to the generator program 805 to allow the generator program to create a logic description. Similarly, the generator program can provide information directly to the synthesis tool instead of writing HDL files. Similarly, input stage 801, generator program 805, and synthesis tool 807 can be integrated into a single program.

For example, SOPC Builder tool available from Altera Corporation, San Jose, Calif. integrates different stages of the electronic device implementation into a single program while implementing various techniques and mechanisms of the present invention for assigning interrupts in the system. In particular, SOPC Builder tool provides system-level design flows for SOPC architectures. SOPC Builder tool may automatically generate interconnect logic (e.g., Avalon™ switch fabric) for connecting components used in SOPC applications. The integrated tool can also be used to assign interrupts in a programmable chip system. The components include embedded processors that may either be internal or external to the FPGA and peripherals.

A user may select various components and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 807.

A synthesis tool 807 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 813 typically follows the synthesis stage 807. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 813, the synthesized netlist file can be provided to physical design tools 819 including place and route and configuration tools. A place and route tool typically locates logic cells on specific logic elements of a target hardware device and connects wires between the inputs and outputs of the various logic elements in accordance with logic required to implement an electronic design. The device can also be physically tested at 823.

For programmable logic devices, a programmable logic configuration stage can take the output of the place and route tool to program the logic device with the user selected and parameterized components. According to various embodiments, the place and route tool and the logic configuration stage are provided in the Quartus Development Tool, available from Altera Corporation of San Jose, Calif.

As noted above, different stages and programs can be integrated in a variety of manners. According to one embodiment, the input stage 801, the generator program 805, the synthesis tool 807, the verification tools 813, and physical design tools 819 are integrated into a single program. The various stages are automatically run and transparent to a user. The program can receive the user-selected components, generate a logic description depicting logic for implementing the various selected components, and implement the electronic device. As will be appreciated by one of skill in the art, HDL files and EDF files are mere examples of a logic description. Other file formats as well as internal program representations are other examples of a logic description.

Figure 9:
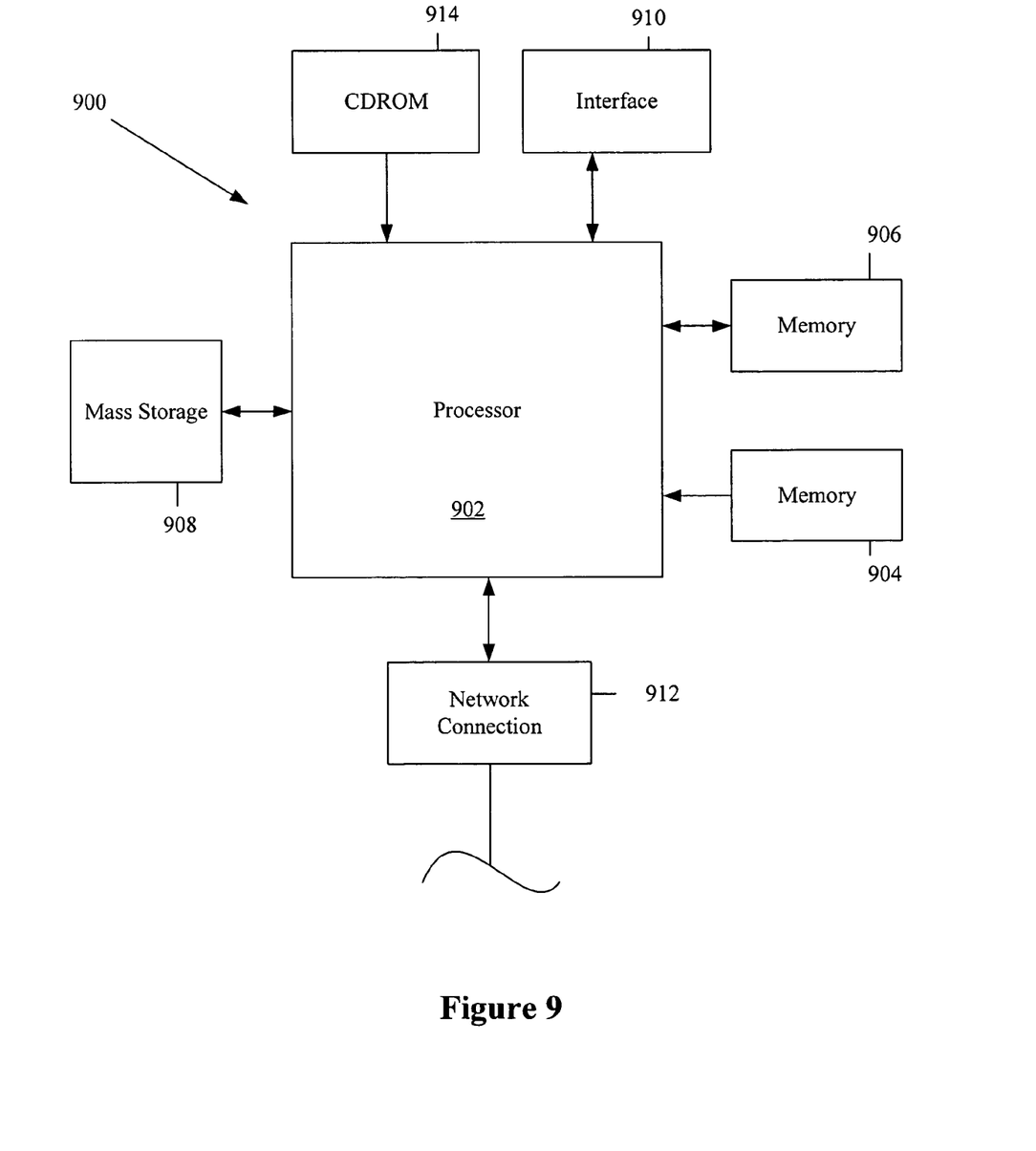
FIG. 9 is a diagrammatic representation of a computer system that can be used to implement the programmable chip.

FIG. 9 illustrates a computer system suitable for implementing various embodiments of the present invention. The computer system 900 includes any number of processors 902 (also referred to as central processing units, or CPUs) that are coupled to devices including memory 906 (typically a random access memory, or "RAM"), memory 904 (typically a read only memory, or "ROM"). The processors 902 can be configured to provide a graphics user interface with effective visual representations for assigning and identifying interrupts in a system according to various embodiments of the present invention. Some representations may be specifically designed to display interrelated data, such as the master and/or slave connections of components along with any corresponding interrupt assignments, from programmable chip systems implementing any of a variety of different system architectures. In one example, programmable chip systems having multiple master and slave components are interconnected with conventional bus architectures. As is well known in the art, memory 904 acts to transfer data and instructions uni-directionally to the CPU and memory 906 is used typically to transfer data and instructions in a bi-directional manner.

Both of these memory devices may include any suitable type of the computer-readable media described above. A mass storage device 908 is also coupled bi-directionally to CPU 902 and provides additional data storage capacity and may include any of the computer-readable media described above. The mass storage device 908 may be used to store programs, data and the like and is typically a secondary storage medium such as a hard disk that is slower than memory. The mass storage device 908 can be used to hold a library or database of prepackaged logic or intellectual property functions, as well as information on generating particular configurations. It will be appreciated that the information retained within the mass storage device 908, may, in appropriate cases, be incorporated in standard fashion as part of memory 906 as virtual memory. A specific mass storage device such as a CD-ROM 914 may also pass data uni-directionally to the CPU.

CPU 902 is also coupled to an interface 910 that includes one or more input/output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Video monitors can be used to display wizards and subwizards to a user. Finally, CPU 902 optionally may be coupled to a computer or telecommunications network using a network connection as shown generally at 912. With such a network connection, it is contemplated that the CPU might receive information from the network, or might output information to the network in the course of performing the above-described method steps. It should be noted that the system 900 may also be associated with devices for transferring completed designs onto a programmable chip. The above-described devices and materials will be familiar to those of skill in the computer hardware and software arts.

The hardware elements described above may be configured to act as multiple software modules for performing the operations of this invention. For example, instructions for running a tool, generator program, input stage (e.g., a wizard), and/or compiler may be stored on mass storage device 908 or 914 and executed on CPU 902 in conjunction with primary memory 906.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, although the present invention has been discussed primarily in the context of assigning interrupts between master and slave combinations/connections in a multi-master system, the present invention is suitable for other data applications and may be tailored correspondingly. Therefore, the scope of the invention should be determined with reference to the appended claims.

What is claimed is:

1. A method for assigning interrupts in a system, comprising:
    receiving a plurality of master components for implementation on a programmable chip;
    receiving a plurality of slave components for implementation on the programmable chip;
    identifying interconnections between the plurality of master and slave components;
    receiving a plurality of interrupt entries for first slave components connected to a first master component;
    comparing each interrupt entry to a range of assignable interrupts for said first master component;
    accepting certain interrupt entries that are within said range of assignable interrupts for said first master component, said accepted interrupt entries being a first set of interrupts;
    assigning said first set of interrupts to said first slave components connected to said first master component; and
    assigning a second set of interrupts to slave components connected to a second master component, wherein an interrupt assigned to the first master component is transparent to the second master component.

2. The method of claim 1, wherein an interrupt assigned to the second master component is transparent to the first master component.

3. The method of claim 1, wherein an interrupt is assigned to both the first master component and the second master component and is transparent to neither the first master component nor the second master component.

4. The method of claim 1, wherein identifying interconnections between the plurality of master and slave components comprises:

connecting the plurality of slave components with the plurality of master components using a simultaneous multiple master component fabric.

5. The method of claim 1, wherein assigning the first set of interrupts to slave components connected to a first master component further comprises:

rejecting the interrupt entries that are outside the range of assignable interrupts for the first master component.

6. The method of claim 1, wherein the range of assignable interrupts includes available and non-available assignable interrupts, and wherein comparing each interrupt entry to the range of assignable interrupts for the first master component comprises:

comparing each interrupt entry to the available assignable interrupts for the first master component; and accepting the interrupt entries that also match the available assignable interrupts for the first master component.

7. The method of claim 6, wherein comparing each interrupt entry to the range of assignable interrupts for the first master component further comprises:

rejecting the interrupts that match the non-available assignable interrupts for the first master component.

8. The method of claim 1, wherein assigning the second set of interrupts to slave components connected to the second master component comprises:

receiving a plurality of interrupt entries for slave components connected to the second master component;

comparing each interrupt entry to a range of assignable interrupts for the second master component; and accepting the interrupt entries that are within the range of assignable interrupts for the second master component, the accepted interrupt entries being the second set of interrupts assigned.

9. The method of claim 8, wherein assigning the second set of interrupts to slave components connected to the second master component further comprises:

rejecting the interrupt entries that are outside the range of assignable interrupts for the second master component.

10. The method of claim 8, wherein the range of assignable interrupts includes available and non-available assignable interrupts, and wherein comparing each interrupt entry to the range of assignable interrupts for the second master component comprises:

comparing each interrupt entry to the available assignable interrupts for the second master component; and accepting the interrupt entries that also match the available assignable interrupts for the second master component.

11. The method of claim 10, wherein comparing each interrupt entry to the range of assignable interrupts for the second master component further comprises:

rejecting the interrupts that match the non-available assignable interrupts for the second master component.

12. The method of claim 1, wherein assigning the first and second set of interrupts operations are automatic using default interrupts.

13. The method of claim 1, further comprising:

identifying the first and second set of interrupts with the first and second master components respectively.

14. An interconnection fabric of a programmable chip, comprising:

an input interface configured to receive an interrupt request from a slave component via first interconnects coupled between said slave component and said input interface;

an interrupt controller coupled to said input interface configured to identify which one of a plurality of master components is associated with the interrupt request, said interrupt controller being further configured to compare the interrupt request to a range of assignable interrupts for each of said master components, the interrupt request being accepted for said identified master component; and an output interface coupled to said interrupt controller for routing the interrupt request to the identified master component via second interconnects coupled between the identified master component and said output interface.

* * * * *